United States Patent
Ohashi et al.

[11] Patent Number: 5,881,309
[45] Date of Patent: Mar. 9, 1999

[54] ELECTRONIC FILE SYSTEM AND METHOD ADAPTED FOR USE WITH A GENERAL-PURPOSE OPERATING SYSTEM FOR PERFORMING PARALLEL PROCESSING OF IMAGE DATA

[75] Inventors: Kazunobu Ohashi; Masayuki Yamada, both of Odawara, Japan

[73] Assignee: Hitachi, Ltd., Tokyo, Japan

[21] Appl. No.: 322,477

[22] Filed: Nov. 1, 1994

[30] Foreign Application Priority Data

Nov. 5, 1993 [JP] Japan ................................. 5-276491

[51] Int. Cl.⁶ .............................. G06F 13/00; G06F 13/14
[52] U.S. Cl. ........................ 395/822; 382/841; 382/872; 382/888
[58] Field of Search ............................ 358/403; 395/840, 395/841, 842, 884, 822, 825, 872, 873, 888, 282

[56] References Cited

U.S. PATENT DOCUMENTS

| | | | |
|---|---|---|---|
| 4,075,691 | 2/1978 | Davis et al. .......................... | 395/884 |
| 4,371,932 | 2/1983 | Dinwiddie, Jr. et al. ............. | 395/841 |
| 4,722,051 | 1/1988 | Chattopadhya ........................ | 395/842 |
| 5,406,384 | 4/1995 | Sakuragi ................................ | 358/403 |
| 5,432,614 | 7/1995 | Yamamoto ............................. | 358/403 |
| 5,461,682 | 10/1995 | Nomura ................................. | 358/403 |
| 5,566,306 | 10/1996 | Ishida .................................... | 395/840 |

FOREIGN PATENT DOCUMENTS

5-2456  1/1993  Japan.

*Primary Examiner*—Scott Rogers
*Attorney, Agent, or Firm*—Antonelli, Terry, Stout & Kraus, LLP

[57] ABSTRACT

An electronic file system and electronic filing method for achieving a high speed input operation under hardware and software environments employing a general-purpose architecture. An image control board having a predetermined capacity of memory and a CPU is connected to a computer system (personal computer), and a plurality of serial devices are connected to the image control board so as to permit these serial devices to be operated in parallel.

14 Claims, 7 Drawing Sheets

ELECTRONIC FILE SYSTEM AND METHOD ADAPTED FOR USE WITH A GENERAL-PURPOSE OPERATING SYSTEM FOR PERFORMING PARALLEL PROCESSING OF IMAGE DATA

BACKGROUND OF THE INVENTION

The present invention relates to an electronic file system and associated method for use under environment of a widely spread operating system (OS), for example, Windows (a trademark of Microsoft Corporation of the United States), for storing image information into storage media, and retrieving and outputting required images from the stored image information. More particularly, the present invention relates to an electronic file system which has device(s) capable of performing parallel processing of image data in order to achieve high speed image processing and so on, and an electronic filing method associated therewith.

In general, conventional electronic file systems available on the market have their hardware and software configured based on their own architectures, as described in JP-A-5-2456. Therefore, an extremely expensive apparatus dedicated to electronic filing must be purchased for realizing the electronic filing.

For the reason set out above, the utilization of hardware and software available in the personal computer market has not been considered for building an electronic file system. The above-mentioned dedicated electronic file system, although it is highly expensive, is not designed to perform additional functions other than those of the electronic file system. The additional functions include, for example, a word processor, a spreadsheet software, and so on which may be executed by a personal computer. The conventional electronic file systems have thus presented poor versatility and extendibility as a computer.

Moreover, when an electronic file system is built so as to be controlled under a non-preemptive operating system, which is widely used for general purpose, in order to reduce the price of the system, a scanner connected to the system as an input device, an optical disk drive employed as a data storage device, and so on can only be operated substantially in series, resulting in a slow processing speed of the system.

SUMMARY OF THE INVENTION

The present invention has been made in view of the problems mentioned above, and it is an object of the invention to provide an electronic file system and electronic filing method which are capable of particularly performing high speed input operations under hardware and software environments employing a general-purpose architecture.

It is another object of the invention to provide a means for use with a computer system having a plurality of peripheral devices operated under its control, which operates these devices in parallel, enhances the operating speed, and reduces image data processing time in the computer system.

More specifically, the object of the invention is to enable a parallel operation of the devices in an image input process in order to achieve a processing (input) speed which is required for a particular purpose by sequentially registering (inputting) image data.

By connecting an image control board of the present invention to a computer system (e.g., a personal computer), an optical disk drive and a scanner can be connected to the personal computer through the image control board. In addition, the image control board enables image data from the scanner to be stored into an optical disk, image data stored in the optical disk to be retrieved and displayed, and the displayed image data to be printed by a printer connected to the personal computer.

As to the registration, image data is stored into an optical disk simultaneously with a scanning operation of image data under non-preemptive operating system, whereby the sequential storing process can be executed at a higher speed.

The term "non-preemptive", used herein, refers to non-preemptive multitasking that is a form of a multitask execution. In this form, a multitask operation is executed by respective applications which voluntarily release a program execution right. For the reason of such a scheme, the operating system is not allowed to forcibly snatch the control (execution right) from an application which does not release the control for a long time or to forcibly terminate an application which is running out of control.

The present invention permits hardware and software for realizing electronic filing functions to be incorporated in a personal computer which is readily available in the personal computer market and employs hardware and software based on a general-purpose architecture, so as not to damage the general-purpose architecture.

Stated another way, the present invention utilizes a personal computer employing an architecture recognized as the standard in the industry to provide an open and highly extensible electronic file system.

Also, according to the present invention, the electronic filing can be accomplished at a low cost by using a personal computer, in which case, when a plurality of devices are operated under a non-preemptive operating system such as Windows, the devices can be operated in parallel to enhance the processing speed.

DESCRIPTION OF THE PREFERRED EMBODIMENTS

An embodiment of the present invention will hereinafter be described in detail with reference to the accompanying drawings.

Figure 1:
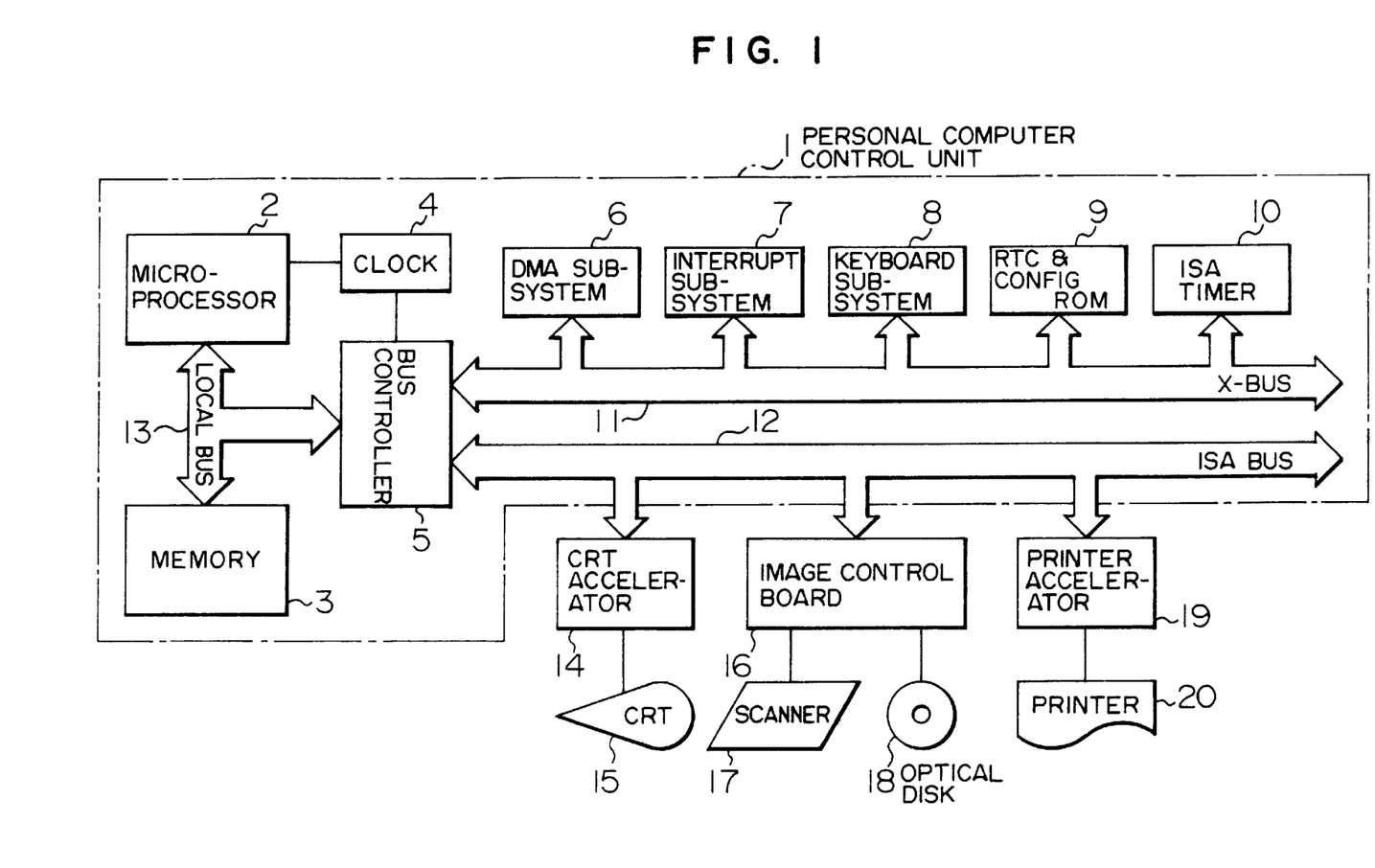
FIG. 1 is a block diagram showing an electronic file system according to an embodiment of the present invention.

FIG. 1 is a block diagram showing an electronic file system of one embodiment of the present invention. A personal computer control unit 1 represents the configuration of a IBM PC/AT (a trademark of IBM Corp.) compatible personal computer, which is a standard general-purpose personal computer in the industry. The control unit 1 includes a microprocessor 2; a clock 4; a DMA sub-system 6; an interrupt sub-system 7; a keyboard sub-system 8; an RTC & CONFIG ROM 9; an ISA timer 10; and a memory 3 for loading micro programs, which memory is connected to the microprocessor 2 via a local bus 13. With this configuration, auxiliary functions and input/output functions associated with the microprocessor 2 are realized as functions of a personal computer by connecting various controllers and devices onto an X-bus (also referred to as a peripheral bus) 11 and an ISA (Industry Standard Architecture) bus 12 through a bus controller 5.

To implement functions of an electronic file system, an image control board 16 for controlling input/output of image information is connected to an extension slot on the ISA bus 12 in the personal computer control unit 1. By connecting the image control board 16 to the personal computer control unit, images can be scanned by a scanner 17; image data can be read from an optical disk 18; and image data can be written into the optical disk 18, under the control of the microprocessor 2.

Further, a printer accelerator board 19 for accelerating the image data printing to a printer 20, and a CRT accelerator board 14 for displaying images on a CRT display 15 at a higher speed can be connected to extension slots on the ISA bus 12. In this manner, the electronic file system of this embodiment of the present can have compatibility with a general-purpose personal computer, by incorporating additional hardware required for the electronic file system into the general-purpose personal computer to conform the electronic file system to the architecture of the general-purpose personal computer.

Figure 2:
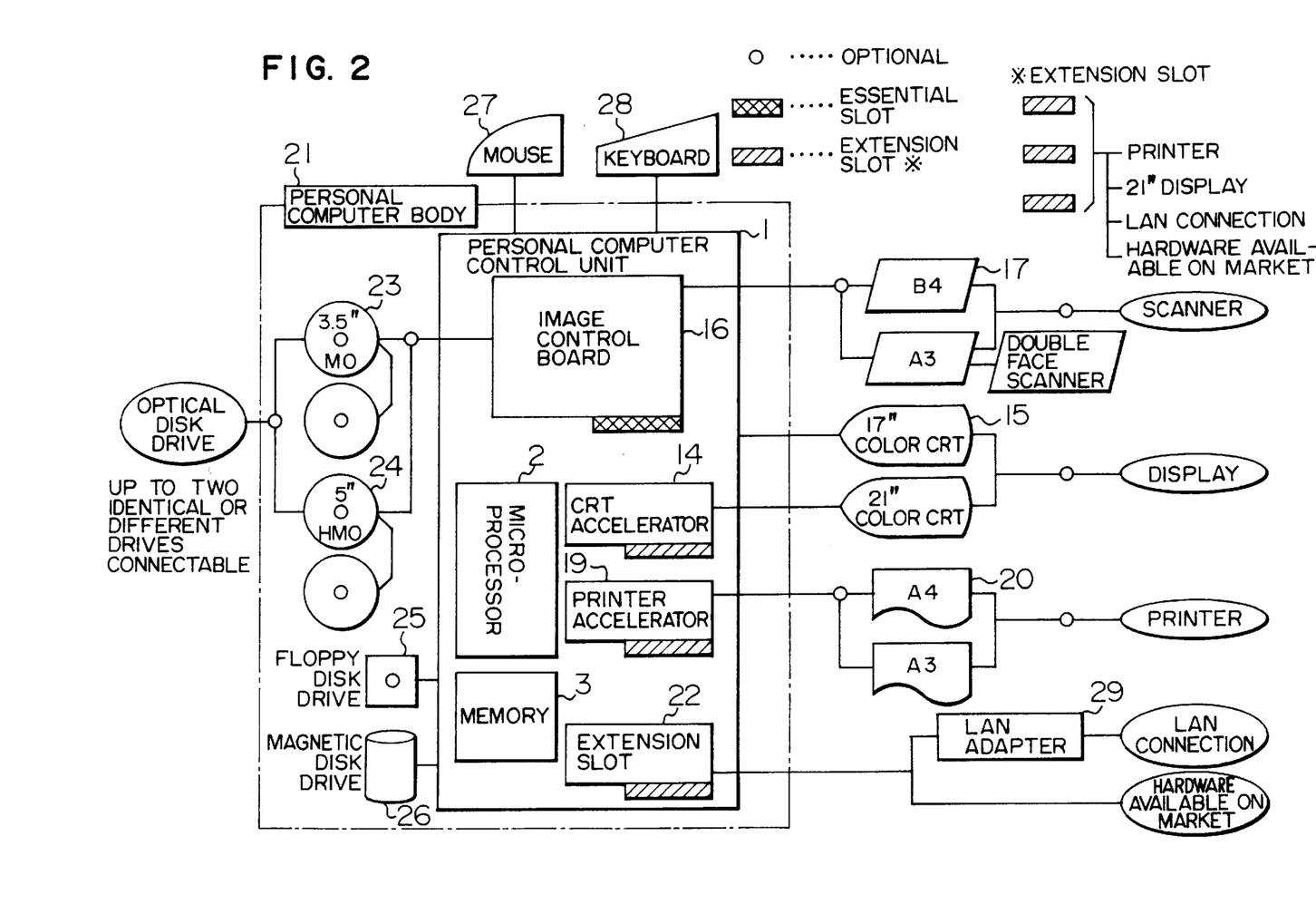
FIG. 2 is a block diagram showing the hardware configuration of the electronic file system according to the embodiment of the present invention.
Figure 3:
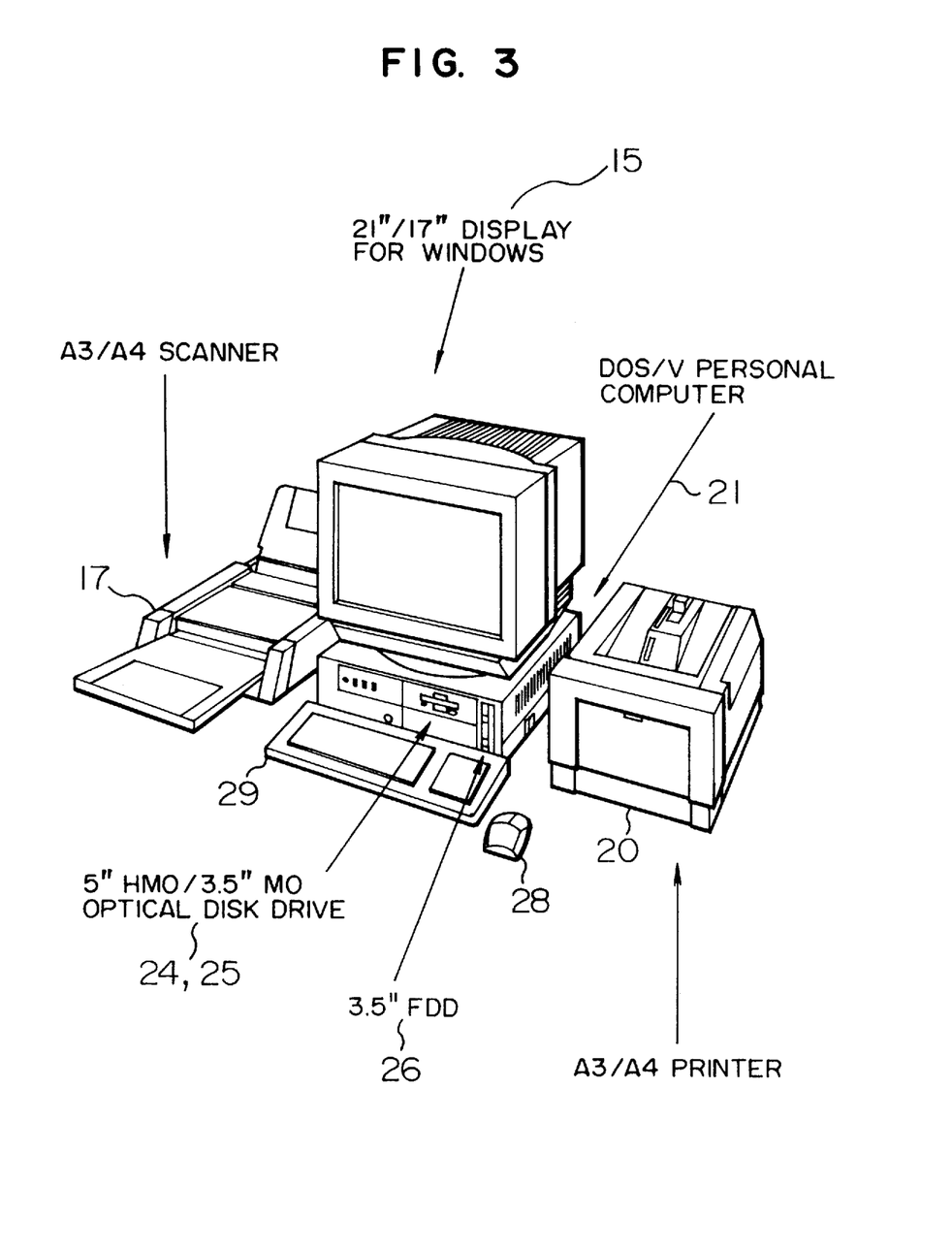
FIG. 3 is a perspective view showing an external appearance of the electronic file system according to the embodiment of the present invention.

FIG. 2 shows the hardware configuration of the electronic file system of this embodiment, and FIG. 3 shows an external appearance of the electronic file system.

As shown in FIG. 2, in a personal computer 21, optical disk drives 23, 24 are incorporated for storing image information. Further, an image control board 16, a CRT accelerator 14, and a printer accelerator 19 are also mounted within the body of the personal computer 21. The personal computer 21 is also connected with a mouse 27; a keyboard 28; a floppy disk drive 25; and a magnetic disk drive 26.

As shown in the external appearance view of FIG. 3, optical disks can be inserted into and removed from the optical disk drives 23, 24 from the front face of the housing of the personal computer 21. Also, as can be seen from the external appearance view, since the hardware such as the optical disk drives and controller for the electronic file system are incorporated within the housing of the personal computer 21, a space-saving system can be provided.

Figure 4:
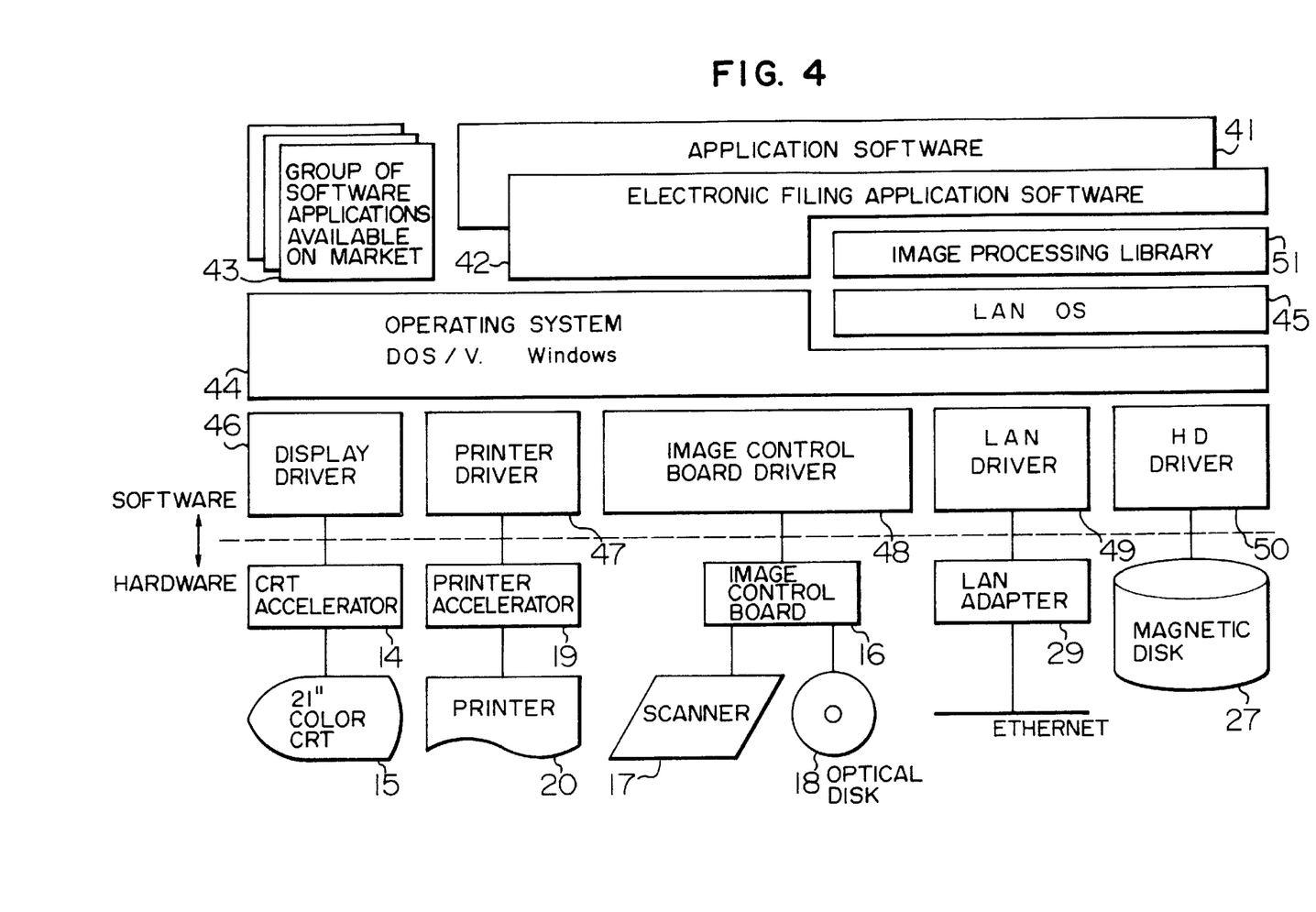
FIG. 4 is a block diagram showing the software architecture of the electronic file system according to the embodiment of the present invention.

FIG. 4 shows the software architecture of the electronic file system according to this embodiment.

This electronic file system employs, as an operating system, the DOS/V Windows (a trademark of Microsoft Corporation. of United States) 44 which is a general-purpose operating system. A group of software applications 43, available on the market, are operated under the control of the general-purpose operating system. An electronic filing application software 42, one of those software applications 41, for driving the electronic file system; an image control board driver 48 for controlling the image control board 16 which in turn controls the scanner 17 and the optical disk drivers; a display driver 46 for controlling the CRT accelerator 14 which in turn controls the CRT display 15, for example, having a 21-inch color CRT; and a printer driver 47 for controlling the printer accelerator 19 which is used for high speed operation of the printer 20, are installed to implement the functions of the electronic file system.

The electronic filing driver 42 starts the image control board driver 48 through the Windows (a trademark of Microsoft Corporation of the United States) operating system 44 and accesses the image control board 16, so that an image is inputted from the scanner 17, and image information is read from and written into an optical disk 18.

An image processing library 51 is provided for compression and expansion of image data by software. Image data inputted from the scanner 17 is compressed by the image processing library 51 and then written into an optical disk. Conversely, when reading image data from an optical disk, the image data is expanded by the image processing library 51 before displaying or printing. Remote data can also be accessed through a LAN (Local Area Network) OS 45, a LAN driver 49, and a LAN adaptor 29. These software applications may be resident on the magnetic disk drive 27 which is controlled by a HD (hard disk) driver 50.

Figure 5:
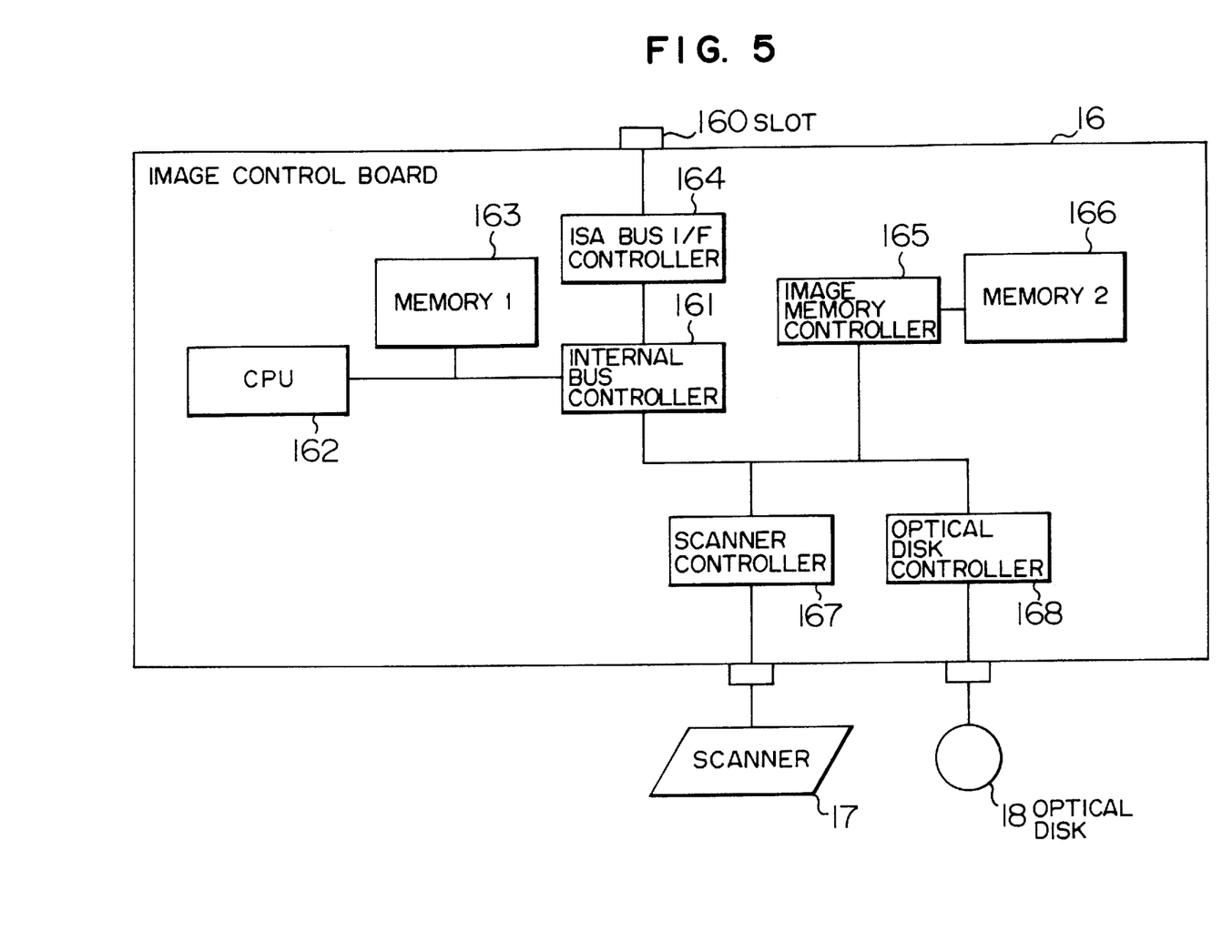
FIG. 5 shows in detail an example of an image control board in FIG. 1.

FIG. 5 is a block diagram showing in detail the image control board 16. Image filing functions performed by means of the image control board will hereinafter be described in detail.

Connecting the image control board 16 to a slot 160 on the ISA bus allows a scanner and an optical disk drive to be connected to the electronic file system through this board 16. A memory 1 (163) has programs executed by a CPU 162. A request to the image control board 16 from the image control board driver 48 (FIG. 4) is synchronized by an ISA bus I/F controller 164 and passed to an internal bus controller 161 through this ISA bus I/F controller 164. The internal bus controller 161 establishes the synchronization of the bus which is connected with the CPU 162; an image memory controller 165; a scanner controller 167, and an optical disk controller 168 (for traffic control). Then, the request is accumulated in a memory 2 (166) through the image memory controller 165 by the CPU 162.

In accordance with a request stored in the memory 2 (166), the CPU 162 requests the scanner controller 167 and the optical disk controller 168 to command devices connected thereto to perform processing associated with the request. In the processing for the sequential registration, an image is first scanned, and then the sequential registration is specified from the electronic filing driver 42 (FIG. 4).

Figure 6:
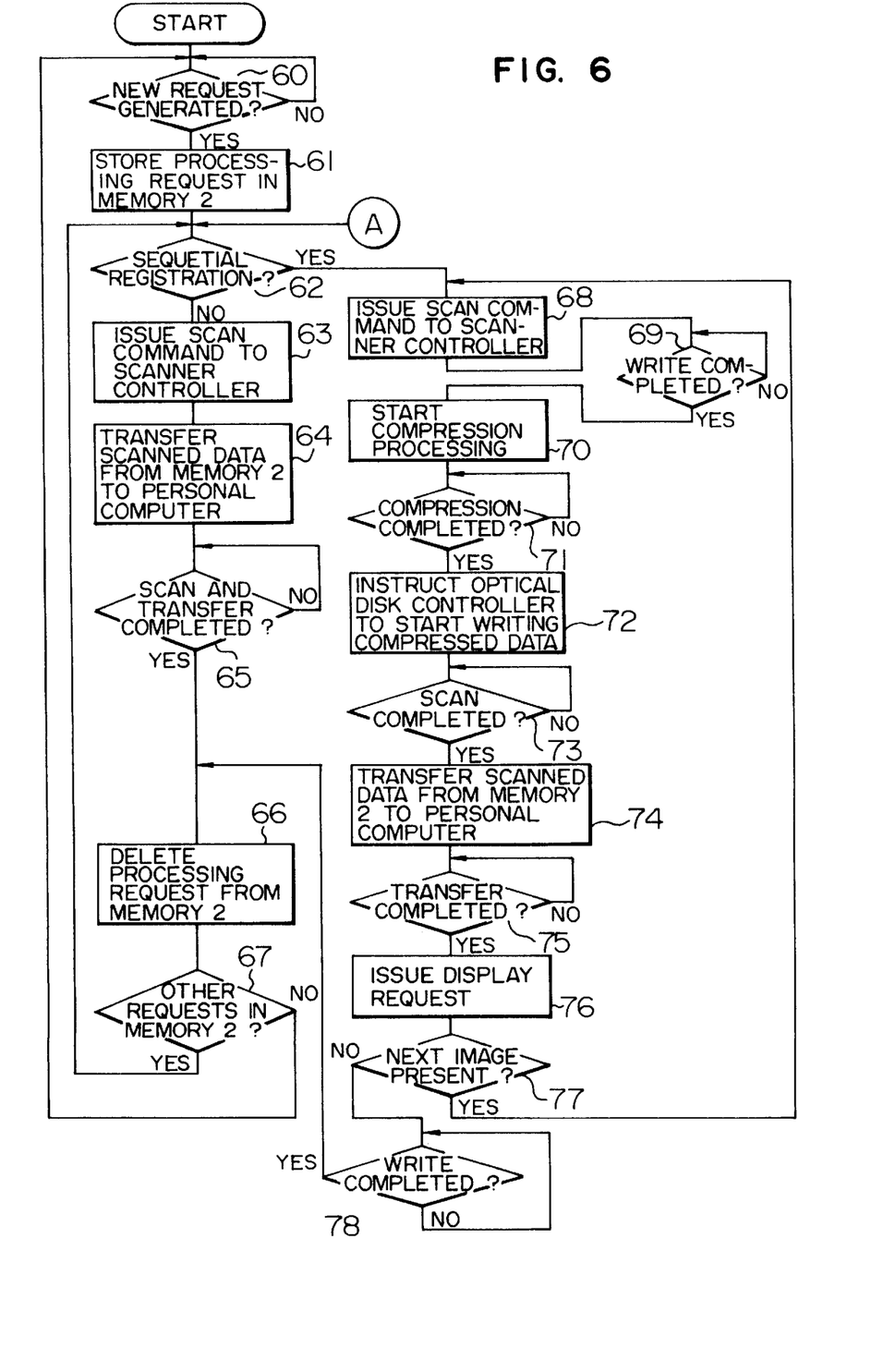
FIG. 6 is a flow chart showing the operation of a sequential registration executed in the image control board of FIG. 5.

FIG. 6 shows a flow chart representing the above-mentioned processing for scanning an image and performing the sequential registration.

The CPU 162 always monitors whether a request is available (step 60). A request from the image control board driver 48 (FIG. 4) to the image control board 16 is passed through the ISA bus I/F controller 164 (FIG. 5) and the internal bus controller 161, and stored in the memory 2 (166) by way of the image memory controller 165 under the control of the CPU 162 (step 61).

It is next determined whether the stored request specifies the sequential registration (step 62). If not, on the assumption that a scan is specified, a scan processing command is issued to the scanner controller 167, and a transfer processing command is issued to the image memory controller 165 (steps 63, 64).

Image data read by the scanner 17 is stored through the image memory controller 165 into the memory 2. The stored image data is transferred to software installed in the personal computer through the image memory controller 165, the internal bus controller 161 and the ISA bus I/F controller 164, and displayed on the CRT display 15.

In the meantime, the CPU 162 monitors whether the scan and transfer processing is completed (step 65), and upon completion, the processing request is deleted from the memory 2 (step 66).

Then, the CPU 162 checks whether other requests remain in the memory 2 (166) (step 67). The flow returns to step 60 when no other request is found, and to the processing mode check at step 62 when any request is found.

Since no remaining request is present until the sequential registration is specified, the CPU 162 is in a request waiting state (step 60). When the sequential registration is specified by a request in a manner similar to the above, the request is stored into the memory 2 (166) (step 61) and the processing mode is checked (step 62), and then the scanning of a second image is started (step 68).

Immediately after starting the scanning of the second image, check is made to determine whether compressed data has completed to write into an optical disk (step 69). Since a write operation is not performed in this case, the CPU 162 instructs the image processing library 51 on the personal computer to start compression of image data which is now displayed on the CRT display 15 (step 70).

At this stage, the scanning operation of the scanner 17 and the compression processing of the personal computer are being executed simultaneously. Upon completion of the compression processing by the personal computer (step 71), compressed data is transferred through the ISA bus I/F controller 164, the internal bus controller 161 and the image memory controller 165 to a region in the memory 2 (166) which is different from a region into which scanned data is presently being stored.

Then, the compressed data is passed to the optical disk controller 168 to be written into an optical disk (step 72). At this time, the scanning operation of the scanner 17 and the write operation to the optical disk are being executed simultaneously. Afterward, when the scanning operation is completed (step 73), the scanned data is transferred to the personal computer, similarly to the processing mentioned above (steps 74, 75), and a display request is issued to associated software on the personal computer (step 76).

The CPU 162 is informed by the scanner controller 167 whether further images to be scanned exist or not (step 77). If such images exist, the flow returns to step 68 to continue the sequential registration processing. If no image to be scanned exists, the flow returns to step 66 after the registration of the compressed data in the optical disk has been completed (step 78). By a sequence of these processing steps, the image input and registration processing can be executed even under a non-preemptive OS environment without stopping the respective devices. In this way, since next image data is inputted while a previous image is registered, high speed sequential registration processing can be performed.

Also, by providing the personal computer with the means for performing the image compression processing on the image control board 16, the image control board 16 is free from communications of scanned data and compressed data with the personal computer, so that the sequential registration processing can be executed at a higher speed.

Figure 7:
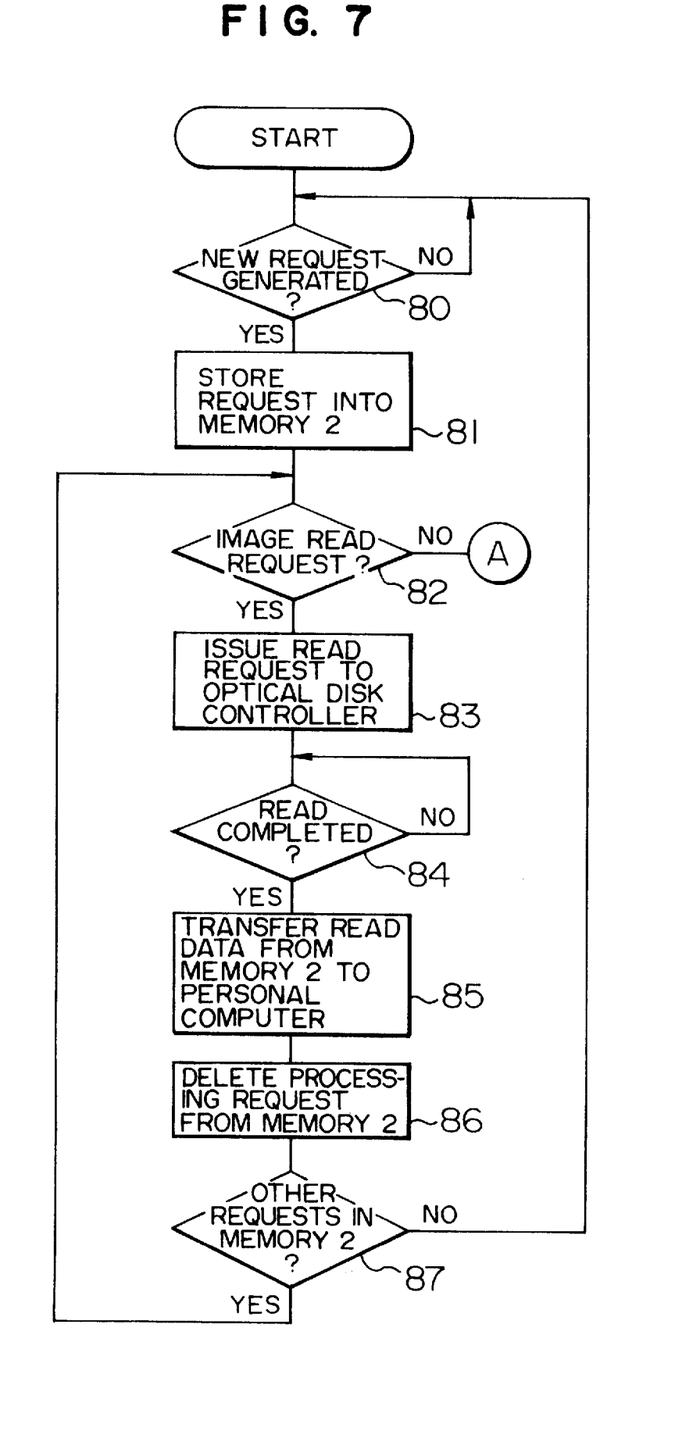
FIG. 7 is a flow chart showing the operation of display, print and retrieval executed in the image control board of FIG. 5.

The operations associated with retrieval, print and display of registered data are shown in the flow chart of FIG. 7. Referring also to FIG. 4, image data specified by the electronic filing driver 42 is received as a request from the image control board driver 48 to the image control board 16, and the request is stored in the memory 2 (166) (steps 80, 81).

Then, the processing mode is checked, and a read command is issued to the optical disk controller 168 when the request is an image read request, to read image data from an optical disk and write it into the memory 2 (166) (steps 82, 83). If the request is not an image read request, the flow returns to step 62 in FIG. 6 (step 82).

After completing the read operation (step 84), the data written in the memory 2 (166) is transferred from memory 2 to the personal computer as is the case of scanned data (step 85). Thereafter, the processing request is deleted from the memory 2 (166) (step 86).

The flow is returned to step 82 when other requests are stored in the memory 2 (166) or to step 80 when no other request exists therein (step 87). The data transferred to the personal computer is processed by the electronic filing driver 42 for display, print and retrieval operations, and then outputted to the display 15 and the printer 20.

In addition, by supplying an output of the printer driver 47 to the image control board 16 instead of the printer 20, text data created by an application on the personal computer can be directly registered in an optical disk as image data.

This direct registration of text data can be carried out by fetching output data of the printer driver 47 into the memory 2 (166) instead of executing the steps 63, 68 in FIG. 6 for issuing a scan command to the scanner 17 and the steps 65, 73 for checking whether the scanning operation has been completed.

This processing can simplify a printer data registration operation which would otherwise require printing data on paper, reading the printed data by a scanner, and registering the read data in an optical disk as image data. Additionally, since output data from the printer is directly registered in the optical disk, the image quality is prevented from being deteriorated.

According to the present invention, by connecting a scanner, an optical disk drive and other serial devices to an existing personal computer through the image control board provided by the present invention, an electronic file system can be configured at a relatively low cost and moreover perform the electronic filing which realizes high speed image input/output processing.

Further, since the image control board of the present invention can perform at a high speed the image data input/output processing which would give rise to problems when a personal computer employing a general-purpose architecture and a general-purpose operating system is used to build an electronic file system, an electronic file system, which may also be utilized as a personal computer, can be built at a relatively low cost.

We claim:

1. An electronic file system, comprising:
  a general-purpose personal computer employing a general-purpose architecture;
  image control means connected to said personal computer;
  input means connected to said image control means for inputting image information;
  image accumulating means connected to said image control means for accumulating said image information; and
  image display means connected to said personal computer for reading and displaying image information accumulated in said image accumulating means;
  wherein filing of image information is performed under control of a general-purpose operating system, said image control means being formed as an image control board to be inserted into an extension slot of said personal computer, said board containing a single memory for storing simultaneously at least a portion of said image information as said image information is being input by said input means and at least a portion of previously scanned image information, wherein said image input means includes a scanner, said image accumulating means includes an optical disk drive, and said scanner and said optical disk drive are connected to said personal computer by inserting said image control board into said extension slot of said personal computer, wherein said personal computer includes compression means for compressing image data from said scanner;

said image control board includes scanner control means for controlling said scanner such that said image data is sequentially inputted to said personal computer in an arbitrary unit, and further control means for commanding said compression means to sequentially compress image data inputted sequentially from said scanner and to store said compressed image data into said optical disk.

2. An electronic file system according to claim 1, wherein said further control means includes a central processing unit, and said central processing unit controls said personal computer such that image data is stored into said optical disk without stopping an image data input operation even on a non-preemptive operating system.

3. An electronic file system according to claim 1, wherein said further control means includes a central processing unit, and said central processing means controls said personal computer such that image data to be next stored is inputted to said personal computer simultaneously with storing of image data even on a non-preemptive operating system.

4. An electronic file system, comprising:

a general-purpose personal computer employing a general-purpose architecture;

image control means connected to said personal computer;

input means connected to said image control means for inputting image information;

image accumulating means connected to said image control means for accumulating said image information; and image display means connected to said personal computer for reading and displaying image information accumulated in said image accumulating means;

wherein filing of image information is performed under control of a general-purpose operating system, said image control means being formed as an image control board to be inserted into an extension slot of said personal computer, said board containing a single memory for storing simultaneously at least a portion of said image information as said image information is being input by said input means and at least a portion of previously scanned image information, wherein said image input means includes a scanner, said image accumulating means includes an optical disk drive, and said scanner and said optical disk drive are connected to said personal computer by inserting said image control board into said extension slot of said personal computer, wherein said personal computer includes a printer driver for directly registering image data created in a printer output format by general-purpose application software in an optical disk.

5. A method of filing image information under the control of an operating system for a general-purpose personal computer which employs a general-purpose architecture, comprising:

a first step of issuing a scan command to a scanner controller for indicating image data to be read so as to start scanning of said image data, said image data being stored in a first predetermined area of a memory;

a second step of issuing, during the scanning of said image data, a compression command to said personal computer for instructing said personal computer to compress previously scanned and transferred image data stored in a second predetermined area of said memory so as to start compression of said previously scanned and transferred image data;

a third step of issuing, when the compression of said previously scanned and transferred image data has been completed, a register command to an optical disk controller to register said compressed image data so as to start writing said compressed image data into an optical disk;

a fourth step of transferring said image data to said personal computer for displaying said image data on a display unit of said personal computer, when the scanning of the image data at said first step has been completed;

a fifth step of repeating said first to fourth steps with next image data being specified as data to be read, when the transfer of the image data at the fourth step has been completed; and a sixth step of repeating said second to fifth steps with said image data transferred at said fourth step being specified as said previously scanned and transferred image data, after said compressed image data has been written into said optical disk at said third step.

6. An electronic file system, comprising:

a general-purpose personal computer employing a general-purpose architecture;

an image control board connected to said personal computer;

a scanner connected to said image control board for inputting image information;

an optical disk drive connected to said image control board for accumulating said image information; and a display connected to said personal computer for reading and displaying image information accumulated in said optical disk drive;

wherein filing of image information is performed under control of a general-purpose operating system, said image control board being inserted into a standard architecture bus slot of said personal computer and containing a CPU, a scanner controller, an optical disk drive controller, and an internal bus controller for synchronizing operation of said CPU, said scanner controller, and said optical drive controller during sending or receiving data, wherein said personal computer includes compression means for compressing image data from said scanner, said scanner controller controls said scanner such that said image data is sequentially inputted to said personal computer in an arbitrary unit, and said compression means sequentially compresses image data inputted sequentially from said scanner and stored said compressed image data into said optical disk.

7. An electronic file system according to claim 6, wherein said CPU controls said personal computer such that image data is stored into said optical disk without stopping an image data input operation even on a non-preemptive operating system.

8. An electronic file system according to claim 6, wherein said CPU controls said personal computer such that image data to be next stored is inputted to said personal computer simultaneously with storing of image data even on a non-preemptive operating system.

9. An electronic file system, comprising:
   a general-purpose personal computer employing a general-purpose architecture;
   an image control board connected to said personal computer;
   a scanner connected to said image control board for inputting image information;
   an optical disk drive connected to said image control board for accumulating said image information; and
   a display connected to said personal computer for reading and displaying image information accumulated in said optical disk drive;
   wherein filing of image information is performed under control of a general-purpose operating system,
   said image control board being inserted into a standard architecture bus slot of said personal computer and containing a CPU, a scanner controller, an optical disk drive controller, and an internal bus controller for synchronizing operation of said CPU, said scanner controller, and said optical drive controller during sending or receiving data,
   wherein said personal computer includes a printer driver being used to directly register image data created in a printer output format by general-purpose application software into an optical disk.

10. A method of filing image information under the control of an operating system for a general-purpose personal computer which employs a general-purpose architecture, comprising:
    issuing a scan command to a scanner controller for indicating image data to be read so as to start scanning of said image data, said image data being stored in a first predetermined area of a memory;
    issuing, during the scanning of said image data, a compression command to said personal computer for instructing said personal computer to compress previously scanned and transferred image data stored in a second predetermined area of said memory so as to start compression of said previously scanned and transferred image data; and
    issuing, when the compression of said previously scanned and transferred image data has been completed, a register command to an optical disk controller to register said compressed image data so as to start writing said compressed image data into an optical disk.

11. A method of filing image information according to claim 10, further comprising:
    transferring said image data to said personal computer for displaying said image data on a display unit of said personal computer, when the scanning of the image data at said first step has been completed;
    repeating said first to fourth steps with said image data transferred at said fourth step being specified as said previously scanned and transferred image data, after said compressed image data has been written into said optical disk at said third step.

12. An electronic file system, comprising:
    a general-purpose personal computer employing a general-purpose architecture;
    image control means connected to said personal computer;
    input means connected to said image control means for inputting image information;
    image accumulating means connected to said image control means for accumulating said image information; and
    image display means connected to said personal computer for reading and displaying image information accumulated in said image accumulating means;
    wherein filing of image information is performed under control of a general-purpose operating system,
    said image control means being formed as an image control board to be inserted into an extension slot of said personal computer, said board containing a single memory for storing simultaneously at least a portion of said image information as said image information is being input by said input means and at least a portion of previously scanned image information,
    wherein said image input means includes a scanner, said image accumulating means includes an optical disk drive, and said scanner and said optical disk drive are connected to said personal computer by inserting said image control board into said extension slot of said personal computer,
    wherein said image control board includes a single central processing unit for controlling input and output of said image information.

13. An electronic file system, comprising:
    a general-purpose personal computer employing a general-purpose architecture;
    image control means connected to said personal computer;
    input means connected to said image control means for inputting image information;
    image accumulating means connected to said image control means for accumulating said image information; and
    image display means connected to said personal computer for reading and displaying image information accumulated in said image accumulating means;
    wherein filing of image information is performed under control of a general-purpose operating system,
    said image control means being formed as an image control board to be inserted into an extension slot of said personal computer, said board containing a single memory for storing simultaneously at least a portion of said image information as said image information is being input by said input means and at least a portion of previously scanned image information,
    wherein said image input means includes a scanner, said image accumulating means includes an optical disk drive, and said scanner and said optical disk drive are connected to said personal computer by inserting said image control board into said extension slot of said personal computer,
    wherein said image control board controls input of image information by said input means and output of image information to said image accumulating means.

14. An electronic file system, comprising:
    a general-purpose personal computer employing a general-purpose architecture;

image control means connected to said personal computer;

input means connected to said image control means for inputting image information;

image accumulating means connected to said image control means for accumulating said image information; and image display means connected to said personal computer for reading a displaying image information accumulated in said image accumulating means;

wherein filing of image information is performed under control of a general-purpose system, wherein said image control means is formed as an image control board adapted for insertion into an extension slot of said personal computer, said board containing a single memory for storing simultaneously at least a portion of said image information as said image information is being input by said input means and at least a portion of previously scanned image information, wherein said input means includes a scanner, said image accumulating means includes an optical disk drive, and said scanner and said optical disk drive are connected to said personal computer by inserting said image control board into said extension slot of said personal computer, wherein said image control board further includes a CPU, a scanner controller, an optical disk drive controller, and an internal bus controller for synchronizing operation of said CPU, said scanner controller and said optical disk drive controller during sending or receiving data, and wherein said electronic file system further includes means for filing image information under control of said operating system in accordance with the following steps:

a first step of issuing a scan command to a scanner controller for indicating image data to be read so as to start scanning of said image data, said image data being stored in a first predetermined area of a memory;

a second step of issuing, during the scanning of said image data, a compression command to said personal computer for instructing said personal computer to compress previously scanned and transferred image data stored in a second predetermined area of said memory so as to start compression of said previously scanned and transferred image data;

a third step of issuing, when the compression of said previously scanned and transferred image data has been completed, a register command to an optical disk controller to register said compressed image data so as to start writing said compressed image data into an optical disk;

a fourth step of transferring said image data to said personal computer for displaying said image data on a display unit of said personal computer, when the scanning of the image data at said first step has been completed;

a fifth step of repeating said first to fourth steps with next image data being specified as data to be read, when the transfer of the image data at the fourth step has been completed; and a sixth step of repeating said second to fifth steps with said image data transferred at said fourth step being specified as said previously scanned and transferred image data, after said compressed image data has been written into said optical disk at said third step.

\* \* \* \* \*